(12) United States Patent
van der Veen et al.

(10) Patent No.: US 10,884,831 B2
(45) Date of Patent: Jan. 5, 2021

(54) COMPOSABLE SYSTEM

(71) Applicant: Apple Inc., Cupertino, CA (US)

(72) Inventors: Peter H. van der Veen, Ottawa (CA);
Shawn R. Woodtke, Richmond (CA);
Stephen J. McPolin, Nepean (CA)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 16/071,722

(22) PCT Filed: Jun. 26, 2018

(86) PCT No.: PCT/US2018/039589
§ 371 (c)(1),
(2) Date: Jul. 20, 2018

(87) PCT Pub. No.: WO2019/005862
PCT Pub. Date: Jan. 3, 2019

(65) Prior Publication Data
US 2020/0310893 A1 Oct. 1, 2020

Related U.S. Application Data

(60) Provisional application No. 62/526,321, filed on Jun. 28, 2017.

(51) Int. Cl.
*G06F 9/54* (2006.01)
*G06F 8/41* (2018.01)
(Continued)

(52) U.S. Cl.
CPC ............. *G06F 9/546* (2013.01); *G06F 8/41* (2013.01); *G06F 9/445* (2013.01);
(Continued)

(58) Field of Classification Search
CPC .................................. G06F 9/544; G06F 9/546
See application file for complete search history.

(56) References Cited

U.S. PATENT DOCUMENTS 6,832,266 B1 * 12/2004 Shaylor ................... G06F 9/485
719/312
7,174,363 B1   2/2007 Goldstein et al.
(Continued)

OTHER PUBLICATIONS

Sun Microsystems, "ChorusOS 5.0 Application Developer's Guide" (2001), pp. 1-186 [retrieved from https://docs.oracle.com/cd/E19048-01/chorus5/806-6894/book-info/index.htnnl].*
(Continued)

*Primary Examiner* — Brian W Wathen
(74) *Attorney, Agent, or Firm* — Kowert, Hood, Munyon, Rankin & Goetzel, P.C.; Lawrence J. Merkel

(57) ABSTRACT

In an embodiment, an operating system for a computer system is built on a set of capabilities. Each capability includes at least one pointer to a function that implements the capability. One or more actors are defined which use one or more of the capabilities, and which may be connected to other actors for communication through channels. The channels may be created and maintained by a channel actor. In an embodiment, one or more actors may be assembled to create a composed actor. The actors within the composed actor still communicate over the channels defined between the internal actors, but may pass channel identifiers for actors outside the composed actor, so that the actors within the composed actor communicate with the outside actors as if they were one single actor. Arbitrarily complex actors may be formed in this fashion, while still maintaining the stability and safety of the initial actors.

20 Claims, 10 Drawing Sheets

(51) Int. Cl.
*G06F 9/445* (2018.01)
*G06F 9/48* (2006.01)
*G06F 21/62* (2013.01)

(52) U.S. Cl.
CPC ............ *G06F 9/44594* (2013.01); *G06F 9/48* (2013.01); *G06F 9/545* (2013.01); *G06F 21/629* (2013.01); *G06F 2209/481* (2013.01); *G06F 2221/2113* (2013.01)

(56) References Cited

U.S. PATENT DOCUMENTS

| | | | |
|---|---|---|---|
| 7,404,203 | B2 | 7/2008 | Ng |
| 7,490,333 | B2 | 2/2009 | Grimaud et al. |
| 2006/0206887 | A1* | 9/2006 | Dodge .................. G06F 9/4887 717/161 |
| 2016/0112540 | A1 | 4/2016 | Xia |
| 2017/0091231 | A1* | 3/2017 | DiFranco ................ G06F 16/21 |
| 2018/0247062 | A1* | 8/2018 | Wurster .................. G06F 21/62 |

OTHER PUBLICATIONS

Kerrisk, M., "Linux Programmer's Manual" (2008), pp. 1-4 [retrieved from https://web.archive.org/web/20120314212202/https://man7.org/linux/man-pages/man2/msgctl.2.html].*

Herder, J., "Towards a True Microkernel Operating System" (2005), pp. 1-134 [retrieved from http://minix3.org/doc/herder_thesis.pdf].*

Krishnan, N.V., "Real-Tiem Systems Design in Ptolemy II: A Time-Triggered Approach" (2004), pp. 1-48 [retrieved from http://citeseerx.ist.psu.edu/viewdoc/download?doi=10.1.1.230.4494&rep=rep1&type=pdf].*

Josuttis, N., "SOA in Practice" (2007), O'Reilly Media Inc., pp. 1-344.*

Graham Hamilton, Panos Kougiouris; "The Spring Nucleus: A Microkernel for Objects," SMLI TR-93-14 the SMLI Technical Report Series, Sun Microsystems Laboratories, Inc. Mountain View, CA 94043 USA Apr. 1993, 15 pages.

QNX Neutrino RTOS System Architecture, QNX Software Development Platform 6.6., QNX Software Systems Limited, 1001 Farrar Road, Ottawa, Ontario, K2K 0B3 Canada, printed from internet, Feb. 20, 2014, 324 pages.

Mach: A New Kernel Foundation for UNIX Development; Mike Accetta, Robert Baron, William Bolosky, David Golub, Richard Rashid, Avadis Tevanian and Michael Young Computer Science Department, Carnegie Mellon University Pittsburgh, PA. 15213, Apr. 1986, 16 pages.

http://www.oracle.com/technetwork/indexes/documentation/index.html, Sun Microsystems, Inc. 901 San Antonio Road Palo Alto, CA 94303-4900 U.S.A. Documentation Home, ChorusOS 5.0 Features and Architecture Overview,Chapter 2 Architecture and Benefits of the ChorusOS Operating System, printed from the internet, Dec. 18, 2017, 17 pages.

IPRP, PCT/US2018/039589, dated Jan. 9, 2020, 8 pages.

Oracle: "System V Messages", www.oracle.com, 2010,Retrieved from the Internet: URL:https://docs.oracle.com/cd/E19683-01/816-5042/svipc-23310/index.html [retrieved on Oct. 1, 2018] the whole document.

Branstad M et al: "Access meditation in a message passing kernel", Proceedings of the Symposium on Security and Privacy. Oakland, May 1-3, 1989; [Proceedings of the Symposium on Security and Privacy], Washington, IEEE Comp. Soc. Press, US, vol.—, May 1, 1989 (May 1, 1989), pp. 66-72, XP010016008, DOI: 10.1109/SECPRI.1989.36278 ISBN: 978-0-8186-1939-7.

ISR and WO, PCT/US2018/039589, dated Oct. 15, 2018, 14 pages.

* cited by examiner

COMPOSABLE SYSTEM

This application is a 371 of PCT Application No. PCT/US2018/039589, filed Jun. 26, 2018, which claims benefit of priority to U.S. Provisional Patent Application Ser. No. 62/526,321, filed on Jun. 28, 2017. The above applications are incorporated herein by reference. To the extent that any material in the incorporated application conflicts with material expressly set forth herein, the material expressly set forth herein controls.

BACKGROUND

Technical Field

This disclosure relates generally to electronic systems and, more particularly, to operating systems on such electronic systems.

Description of the Related Art

Most electronic systems (e.g. computing systems, whether stand alone or embedded in other devices) have a program which controls access by various other code executing in the system to various hardware resources such as processors, peripheral devices, memory, etc. The program also schedules the code for execution as needed. This program is typically referred to as an operating system.

Typical operating systems include a large code base with many programming interfaces, calls and cross calls, and frequently updated modules such as drivers for devices in the system. Such operating systems have a large "attack surface" with many vulnerable points that a nefarious third party can attempt to exploit. Additionally, most of the operating system executes in privileged mode, giving the large body of code access to many sensitive resources in the system that, if changed by an attacker, can cause erroneous operation. Because of the complexity of the operating system, it is difficult to show that the operating system is safe and stable in a given environment.

SUMMARY

In an embodiment, an operating system for a computer system is built on a set of capabilities. Each capability includes at least one pointer to a function that implements the capability. One or more actors are defined which use one or more of the capabilities, and which may be connected to other actors for communication through channels. The channels may be created and maintained by a channel actor. Because the interface to each actor is tightly controlled via the channel, the attack surface for any given actor may be small. Additionally, if each actor is proven to be stable and safe, then combinations of the actors are stable and safe.

In an embodiment, one or more actors may be assembled to create a composed actor. The actors within the composed actor still communicate over the channels internal to the composed actor, but may pass channel identifiers for actors outside the composed actor, so that the actors within the composed actor communicate with the outside actors as if they were one single actor. Arbitrarily complex actors may be formed in this fashion, while still maintaining the stability and safety of the initial actors.

BRIEF DESCRIPTION OF THE DRAWINGS

The following detailed description makes reference to the accompanying drawings, which are now briefly described.

Figure 1:
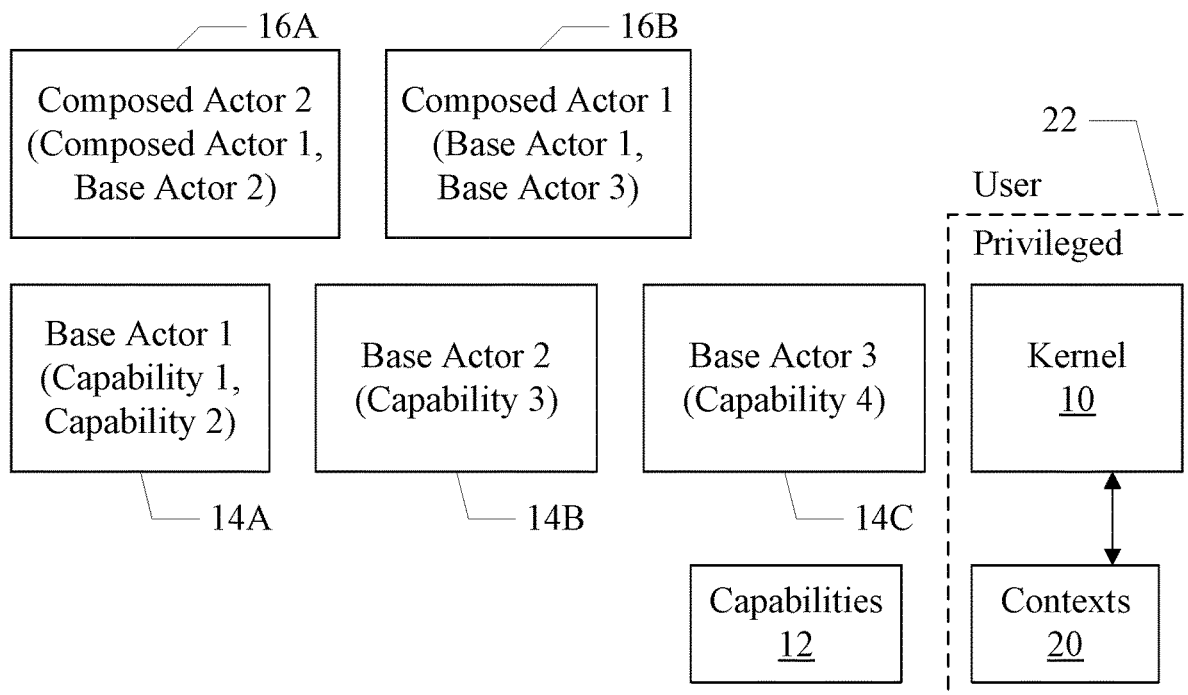
FIG. 1 is a block diagram of one embodiment of a generic operating system in accordance with this disclosure.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

Turning now to FIG. 1, a block diagram of one embodiment of an operating system and related data structures is shown. In the illustrated embodiment, the operating system includes a kernel 10, a set of capabilities 12, a set of base actors 14A-14C, and a set of composed actors 16A-16B. The kernel 10 may maintain one or more contexts 20. There may be any number of base actors and composed actors in a given embodiment.

Each capability 12 includes a function in an address space that is assigned to the capability 12. The data structure for the capability 12 may include, e.g., a pointer to the function in memory in a computer system. In an embodiment, a given capability 12 may include more than one function. In an embodiment, the capability 12 may also include a message mask defining which messages are permissible to send to the capability 12. A given actor 14A-14C or 16A-16B which employs the capability 12 may further restrict the permissible messages, but may not override the messages which are not permissible in the capability 12 definition. That is, the capability 12 definition may define the maximum set of permissible messages, from which a given actor may remove additional messages. While message masks are used in some embodiments, any mechanism for identifying valid messages for the capability and further restricting messages in a given actor may be used. The union of the permitted messages may be the permitted messages in the given actor.

Each actor 14A-14C may employ one or more capabilities 12. For example, the actor 14A employs two capabilities, while the actors 14B-14C each employ one capability. A given actor may employ any number of capabilities, and a given capability may be employed by any number of actors.

Because actors 14A-14C directly employ capabilities 12 and do not include other actors, the actors 14A-14C may be referred to as base actors. The base actors may provide the low level functions of the operating system. Other actors may be composed actors, such as the actors 16A-16B. Composed actors 16A-16B may be assembled from other actors, either base actors or other composed actors. For example, composed actor 16A is assembled from composed actor 16B and base actor 14B. Composed actor 16B is assembled from base actors 14A and 14C. Any amount of assembly may be permitted in various embodiments (e.g. composed actors may include other actors that are themselves composed actors, which may further include actors that are themselves composed actors, etc.). In an embodiment, a composed actor 14A-14C may employ additional capabilities 12 as well. In an embodiment, the operating system disclosed herein may be viewed as a lightweight capability system, as the structure to access the capability may simply be one or more pointers to the capability function. This differs from the use of keys and tree spanning access methods that some capability-based systems use.

Accordingly, an actor may generally be defined as a container for one or more capabilities, either directly employed or employed via the inclusion of another actor. A container may be any type of data structure, class, data type, etc. that can store data allowing the capabilities to be accessed/executed. For example, a data structure with pointers to capabilities (or to other actors which point to the capabilities in a pointer chain) may be one form of container. More generally, a container may be any structure that organizes a group of objects in a defined way that follows specific access rules. In an embodiment, actors may be compiled into the operating system and may be optimized to limit the number of exceptions that may occur (e.g. by merging code into the actor, allowing some or all of the actor to execute in privileged space, etc.). When the code is merged together, the exception in the code one actor that would have lead to execution of code in another actor may be eliminated since the code has been merged. However, the model that the system is designed to may be that the actor is a container and may be proven to be safe and stable. Then, the compiled version may be shown to be equivalent to the model and thus also safe and stable. Safety and stability may be critical in certain products in which the operating system may be employed. For example, the operating system may be in a computing system that is embedded in the product. In one particular case, the product may be a vehicle and the embedded computing system may provide one or more automated navigation features. The vehicle may include many include any type of vehicle such as an aircraft, boat, automobile, recreational vehicle, etc. In some embodiments, the automated navigation features may automate any portion of navigation, up to and including fully automated navigation in at least one embodiment, in which the human operator is eliminated. Safety and stability may be key features of such an operating system. Additionally, security of the operating system may be key in such cases, as an attack which disables or destabilizes the system may disable the vehicle or possibly even cause a crash. In a traditional monolithic kernel operating system, the one operating system entity (the kernel) is responsible for all functions (memory, scheduling, I/O, time, thread management, interrupts, etc.). Any compromise in any of the functions could compromise the whole system. In the present operating system, however, the entities are separated and communicate via channels that do not permit compromise. Each entity may be provided with as much privileged and as needed to complete its operation. Thus, a compromise of one entity may not compromise the system and the leakage of privileged that often occurs in the monolithic kernel is not possible.

In an embodiment, the operating system may be a real time operating system that is designed to complete tasks within specified time intervals, so that the system may respond quickly enough to manage events that are occurring in "real time" (e.g. without undue buffering or other delays). For example, in the automated navigation functions mentioned above, the system may be able to react quickly enough to inputs in order to effectuate corresponding automated navigation outputs to keep the vehicle operating in a safe manner.

In an embodiment, a composed actor may use a subset of the interfaces (e.g. channels, as discussed in more detail below) to the component actors included in the composed actor (where the subset may exclude one or more interfaces or may include up to all of the interfaces of the component actors of the composed actors, as desired). The interfaces to the composed actor may be provided to other actors wishing to communicate with the composed actor, and thus it may appear to the other actor that the composed actor is a single actor. In one embodiment, the other actor may have one or more channels to the composed actor, and some of those channels may be associated with/communicate with different component actors of the composed actor. The other actor may simply have a channel identifier to access the channel and transmit/receive messages on the channel, and thus is unaware of which component actor is communicating on the channel, or is event unaware of the existence of component actors. In an embodiment, the component actors may, at least in the model, remain independent and thus are not "aware" that they are part of the composed actor. Instead, their interfaces may be used by the actors that interact with the composed actor. Other interfaces may be connected internally to other component actors. Each component actor may operate in the same fashion whether part of the composed actor or operating as a stand-alone actor.

The dotted line 22 divides the portion of the operating system that operates in user mode (or space) and the portion that operates in privileged mode/space. As can be seen in FIG. 1, the kernel 10 is the only portion of the operating system that executes in the privileged mode in this embodiment. The remainder of the operating system executes in the user mode. Privileged mode may refer to a processor mode (in the processor executing the corresponding code) in which access to protected resources is permissible (e.g. control registers of the processor that control various processor features, certain instructions which access the protected resources may be executed without causing an exception, etc.). In the user mode, the processor restricts access to the protected resources and attempts by the code being executed to change the protected resources may result in an exception. Read access to the protected resources may not be permitted as well, in some cases, and attempts by the code to read such resources may similarly result in an exception. Because most of the operating system executes in the user space, the user mode protections may apply. Thus, "privilege leak," in which privileged code that is expected to access only certain protected resources but actually accesses others through error or nefarious intent, may be much less likely in the disclosed embodiments. Viewed in another way, each entity in the system may be given the least amount of privileged possible for the entity to complete its intended operation.

Moreover, the kernel 10 may be responsible for creating/maintaining contexts 20 for actors, but may include no other functionality in this embodiment. Thus, in an embodiment, the kernel 10 may be viewed as a form of microkernel. The contexts 20 may be the data which the processor uses to resume executing a given code sequence. It may include settings for certain privileged registers, a copy of the user registers, etc., depending on the instruction set architecture implemented by the processor. Thus, each actor may have a context (or may have one created for it by the kernel 10, if it is not active at the time that another actor attempts to communicate with it).

Figure 2:
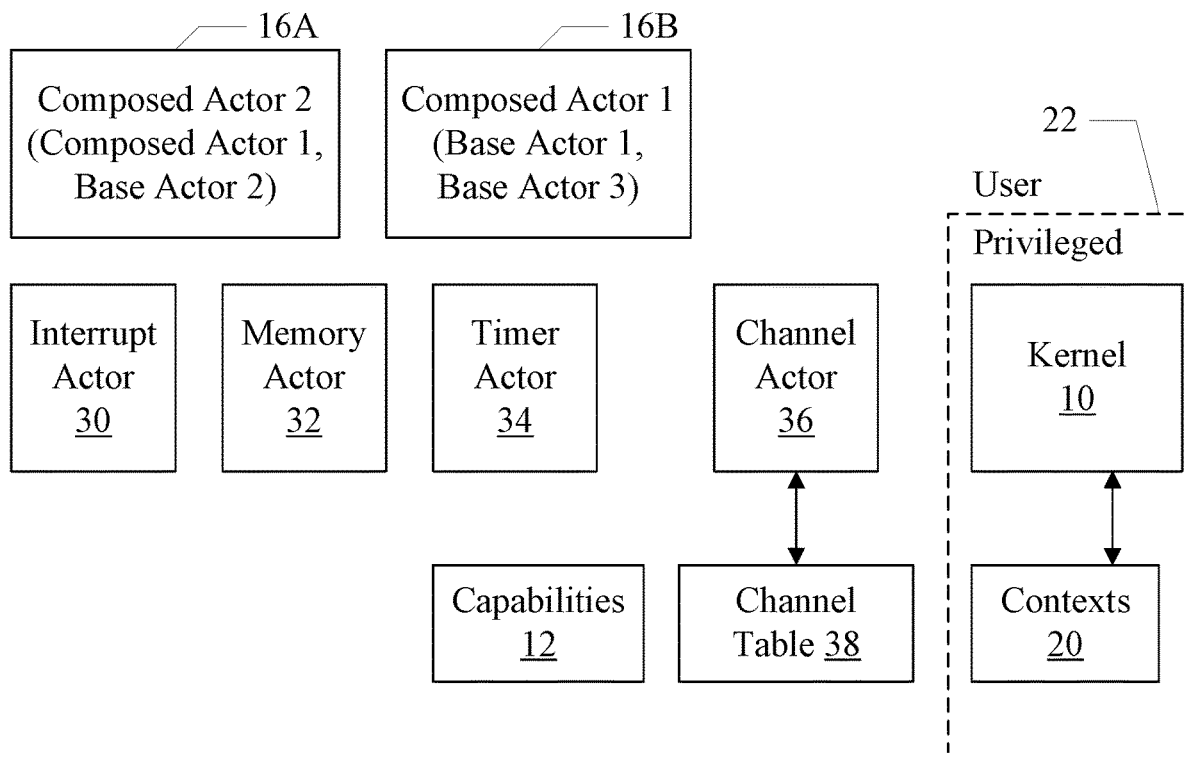
FIG. 2 is a block diagram of one embodiment of a more specific operating system in accordance with this disclosure.

FIG. 2 is a more specific embodiment of the operating system. The base actors may include an interrupt actor 30, a memory actor 32, a timer actor 34, and a channel actor 36. Other embodiments may include additional base actors, subsets of the illustrated base actors and other base actors, etc.

The interrupt actor 30 may be responsible for handling interrupts in the system (e.g. interrupts asserted by devices in the system to the processor, or interrupts asserted by processors to other processors). In an embodiment, the interrupt actor 30 may be activated by the kernel 10 in response to interrupts (as opposed to exceptions that occur within a processor in response to internal processor operation/instruction execution). The interrupt actor 30 may gather information about the interrupt (e.g. from an interrupt controller in the computing system on which the operating system executes, interrupt controller not shown) and determine which actor in the system should be activated to respond to the interrupt (the "targeted actor" for that interrupt). The interrupt actor 30 may generate a message to the targeted actor to deliver the interrupt.

The memory actor 32 may be responsible for managing memory, providing access to memory when requested by other actors and ensuring that a given memory location is only assigned to one actor at a time. The memory actor 32 may operate on physical memory. Other actors may be implemented to, e.g., provide a virtual memory system. Such actors may use the memory actor 32 to acquire memory as needed by the virtual memory system. That is, such actors may be composed actors that incorporate the memory actor 32 and other functions (e.g. capabilities, or capabilities in other actors).

The timer actor 34 may be responsible for implementing a timer in the system. The timer actor 34 may support messages to read the timer, set an alarm, etc.

The channel actor 36 may be responsible for creating and maintaining channels between actors. Channels may be the communication mechanism between actors for control messages. Data related to the control messages may be passed between actors in any desired fashion. For example, shared memory areas, ring buffers, etc. may be used.

In an embodiment, an actor may create a channel on which other actors may send the actor messages. The channel actor 36 may create the channel, and may provide an identifier (a channel identifier, or Cid) to the requesting actor. The Cid may be unique among the Cids assigned by the channel actor 36, and thus may identify the corresponding channel unambiguously. The requesting actor may provide the Cid (or "vend" the Cid) to another actor or actors, permitting those actors to communicate with the actor. In an embodiment, the requesting actor may also assign a token (or "cookie") to the channel, which may be used by the actor to verify that the message comes from a permitted actor. That is, the token may verify that the message is being received from an actor to which the requesting actor gave the Cid (or another actor to which that actor passed the Cid). In an embodiment, the token may be inaccessible to the actors to which the Cid is passed, and thus may be unforgeable. For example, the token may be maintained by the channel actor 36 and may be inserted into the message when an actor transmits the message on a channel. Alternatively, the token may be encrypted or otherwise hidden from the actor that uses the channel. In an embodiment, the token may be a pointer to a function in the channel-owning actor (e.g. a capability function or a function implemented by the channel-owning actor).

The channel actor 36 may track various channels that have been created in a channel table 38. The channel table 38 may have any format that permits the channel actor to identify Cids and the actors to which they belong. When a message having a given Cid is received from an actor, the channel actor 36 may identify the targeted actor (the actor that is to receive the message) via the Cid. The channel actor 36 may request activation of the targeted actor and may relay the message to the targeted actor.

In an embodiment, each actor/capability within an actor may be activated to respond to a given message. The activation may be associated with a context 20, which may be created for the activation if a context for the actor does not yet exist in the contexts 20. Once the activation has completed processing the message, the actor may dissolve, or dematerialize, or destroy itself. The dissolving may include deleting the context and closing the thread. Thus, there may be not persistent threads in the system. Each thread may be activated when needed, and dissolve when complete. In other embodiments, threads may be created for each actor/capability. The threads may block, but remain live in the system, after completing processing of a message. Accordingly, the thread may be initialized already, and may have a context 20, when a given message is received for that thread to processor. Unless expressly tied to activation/dissolution herein, various features disclosed herein may be used with the longer-living threads. In such embodiments, an activation may be similar to unblocking a thread and a dissolve may be similar to blocking a thread.

In another embodiment, one or more of the base actors (e.g. one or more of the actors 30, 32, 34, and 36) may execute in the privileged mode/space (e.g. on the same side of the dotted line 22 as the kernel 10 in FIG. 2).

Figure 3:
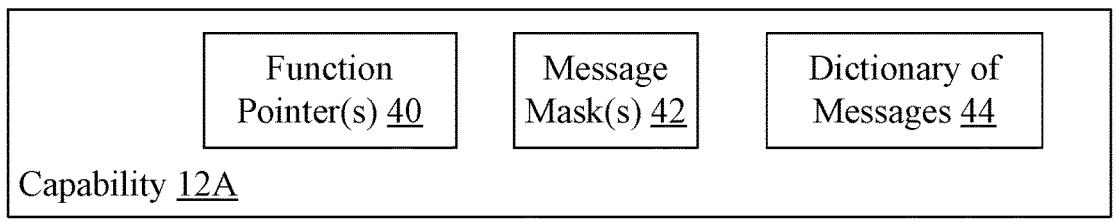
FIG. 3 is a block diagram of one embodiment of a capability.

FIG. 3 is a block diagram of one embodiment of a capability 12A, which may be one of the capabilities 12 shown in FIGS. 1 and 2. The capability 12A includes a function pointer or pointers 40, a message mask 42, and a dictionary of messages 44. The function pointer 40 may be a pointer to the capability's function in memory. In other embodiments, the function may be identified in other ways in the capability 12A. For example, the capability may be indicated by an entry in a table (which may store the pointer to the function or other identifier of the function). The capability may be indicated by an offset with a block of memory (e.g. a page or pages) allocated to the capability 12A, etc. The capability's function may be stored in memory (a memory address space) allocated to the capability 12A. The message mask 42 may indicate which messages are enabled. In an embodiment, each message may be identified by a number, and the message mask 42 may be a bit vector, where each bit in the vector corresponds to the message number of its position within the vector. If the message is permissible, the bit may be a one and if the message is not permissible, the bit may be a zero (or vice versa). In an embodiment, the messages may be randomly distributed among the message numbers so that the messages may not be discovered simply be enumerating from zero. As mentioned previously, if a message is not permissible as indicated in the message mask 42, then the message may not be used for the capability 12A, as actors may not be capable of overriding the message mask 42 when it has a message marked as impermissible. If there are multiple function pointers 40, then there may be multiple message masks 42 (one for each function pointer). The dictionary of messages 44 may describe each message, expected format and content of the message, etc. While a message mask is used in this embodiment, in other embodiments any mechanism for specifying a set of permissible messages may be used. Generally, the message mask or other indication may be a message permission indication. The message permission indication may be in the form of a mask, a list, an array, a table, etc.

Figures 4, 5:
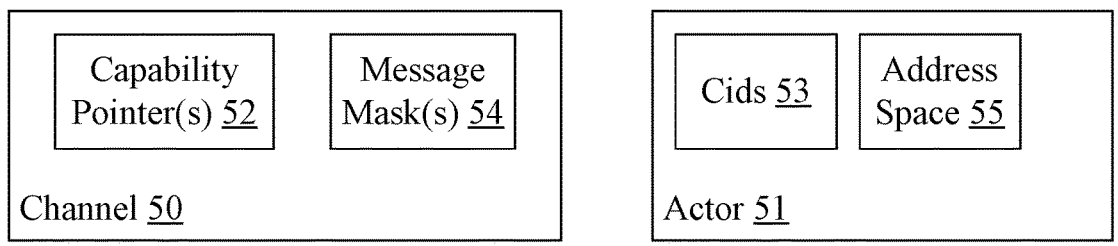
FIG. 4 is a block diagram of one embodiment of a channel.
FIG. 5 is a block diagram of one embodiment of an actor.

FIG. 4 is a block diagram of one embodiment of a channel 50. In the illustrated embodiment, the channel 50 includes one or more capabilities (e.g. implemented in this embodiment as capability pointers 52) and message masks 54 (or other message permission indications. The capability pointers 52 point to capabilities 12 that correspond to the channel 50. In an embodiment, a channel 50 may connect to one corresponding capability 12A. Other embodiments may permit connection to multiple capabilities called in series or in parallel. For each capability, the channel 50 may include a message mask 54. The message mask 54 may indicate the permissible messages for the corresponding capability as used within the actor to which the channel belongs. The message mask 54 need not be a superset of the message mask 42 for the capability. Instead, the operating system may ensure that the message mask 42 is inherited by the channel 50. That is, the impermissible messages for the channel 50 may be the union of the impermissible messages specified by the message mask 42 for the capability and the impermissible messages specified by the message mask 54. As mentioned previously, while message masks are used in this embodiment, other embodiments may use any mechanism to specify an initial set of permissible messages in the capability 12 and to further restrict the permissible messages in the channel 50.

FIG. 5 is a block diagram of one embodiment of an actor 51, which may be representative of any of the actors 14A-14C, 16A-16B, 30, 32, 34, and/or 36 shown in FIGS. 1 and 2. As mentioned previously, an actor 51 may be a container for one or more capabilities. More specifically, the actor 51 may be a container for Cids 53 for channels to various capabilities 12. The actor 51 may also include an address space 55. In an embodiment, the address space 55 may be a Cid to the memory actor 32, which may provide access to the memory space assigned to the actor 51. In other embodiments, the address space 55 may include a descriptor of the address space (e.g. base address and extent) but may not be modifiable by the actor 51. The capabilities 12 that are employed by the actor 51 may exist in the address space 55.

Figure 6:
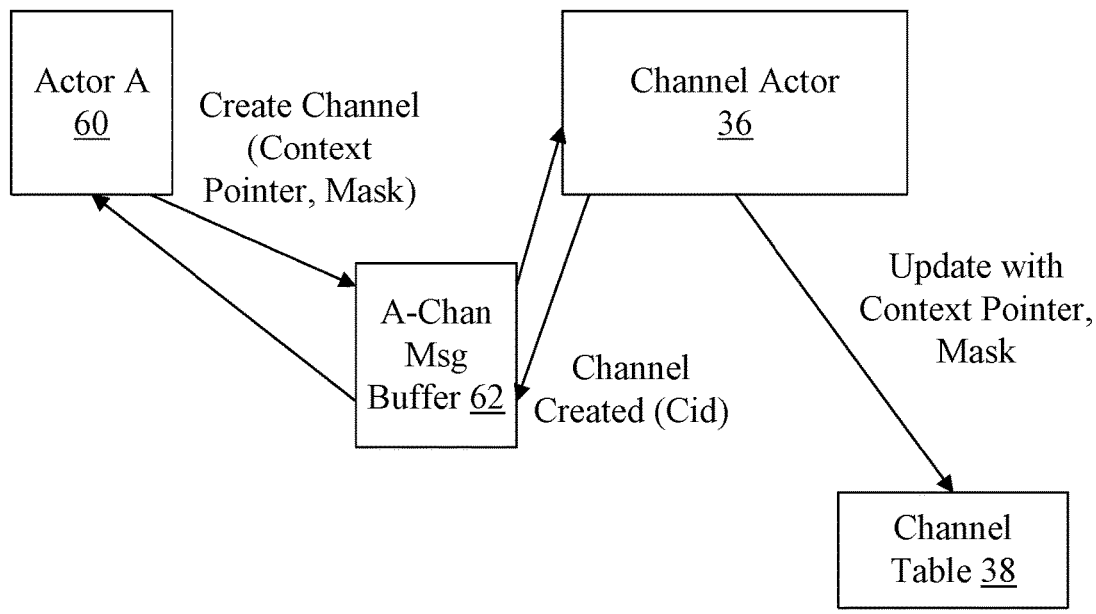
FIG. 6 is a block diagram illustrating one embodiment of channel creation.
Figure 7:
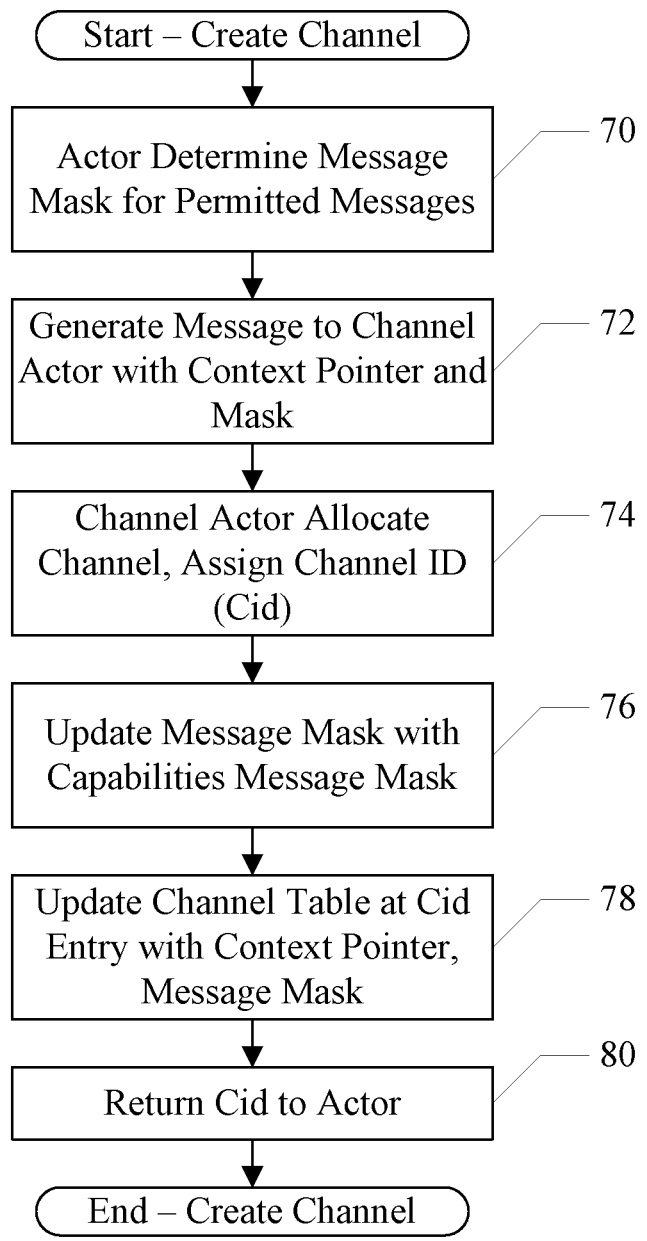
FIG. 7 is a flowchart illustrating one embodiment of channel creation.

FIG. 6 illustrates one embodiment of the passing of messages from an actor 60 (which may be any of the actors 14A-14C, 16A-16B, 30, 32, 34, and/or 36 shown in FIGS. 1 and 2 and may have the structure of FIG. 5). FIG. 7 is a corresponding flowchart illustrating operation of one embodiment of the actor 60 and the channel actor 36 to create a channel. While the blocks are shown in a particular order for ease of understanding, other orders may be used. The actor 60 and/or the channel actor 36 may include code which, when executed, implements the operation shown in FIGS. 6 and 7.

The actor 60 may determine that a new channel is desired, and may generate a message to the channel actor 36 to create the channel. The channel actor 36 may define a create channel message which may be used on a channel between the actor 60 and the channel actor 36 to create a channel. In an embodiment, the actor 60 may determine which function (e.g. capability 12) is to be called when a message is received on the channel, as well as a message mask for permitted messages on the channel (block 70, FIG. 7). A context pointer for the function, or for the actor 60 itself, may be provided in the create channel message, along with the message mask (block 72, FIG. 7). The context pointer may be the above-mentioned token, or the actor 60 may separately include a token as well, in various embodiments. The actor 60 may pass the message to the channel actor 36. In one embodiment, the message may be passed through a shared memory area shown as a message buffer 62. A shared memory area may be a region of memory that is accessible (e.g. readable and/or writeable) to both the actor 60 and the channel actor 36. In some embodiments, the shared memory area may be a stack that is used by the processor executing the actor 60, and the area may be accessible because the actor 60 may have an exception to transmit the message (e.g. the message may be written to the stack and then the actor 60 may execute a system call (Syscall) instruction that causes the exception). In an embodiment, the Syscall instruction may be an illegal instruction. In another embodiment, the Syscall instruction may be a privileged instruction and since the actors execute in user space, the Syscall instruction may cause an exception. That is, the Syscall instruction is a valid instruction that a user space thread is not permitted to execute. Generally, an exception may be any mechanism in a processor executing code that causes the processor to interrupt code execution at the instruction for which the exception occurs, save some amount of processor state, and vector to a known address associated with the exception at which the exception may be handled. In general, exception handling may include remedying the situation that caused the exception so that the instruction may be reexecuted without exception, or terminating the thread for which the exception occurred. In an embodiment, the exception for the Syscall instruction may be handled by transmitting the message that has been created by the actor in which the exception was detected.

The channel actor 36 may read the buffer 62 and decode the create channel message. The channel actor 36 may allocate a channel for the actor 60 and assign a channel ID (Cid) to the channel (block 74, FIG. 7). The channel actor 36 may also update the message mask provided from the actor 60 with the message mask 42 from the corresponding capability, if applicable (block 76, FIG. 7). That is, the masks may be combined so that the resulting mask permits only those messages that are permissible in both the capability's message mask and the actor's message mask. The channel actor 36 may take the union of the message masks, and thus a message may be permitted only if it is permitted by both message masks. The channel actor 36 may update the channel table 38 with the data identifying the channel (e.g., Cid, context pointer, token (if separate), updated message mask, etc.) (block 78, FIG. 7). The channel actor may return the Cid to the actor 60 (e.g. through the buffer 62 as a channel created message) (block 80, FIG. 7).

Figure 8:
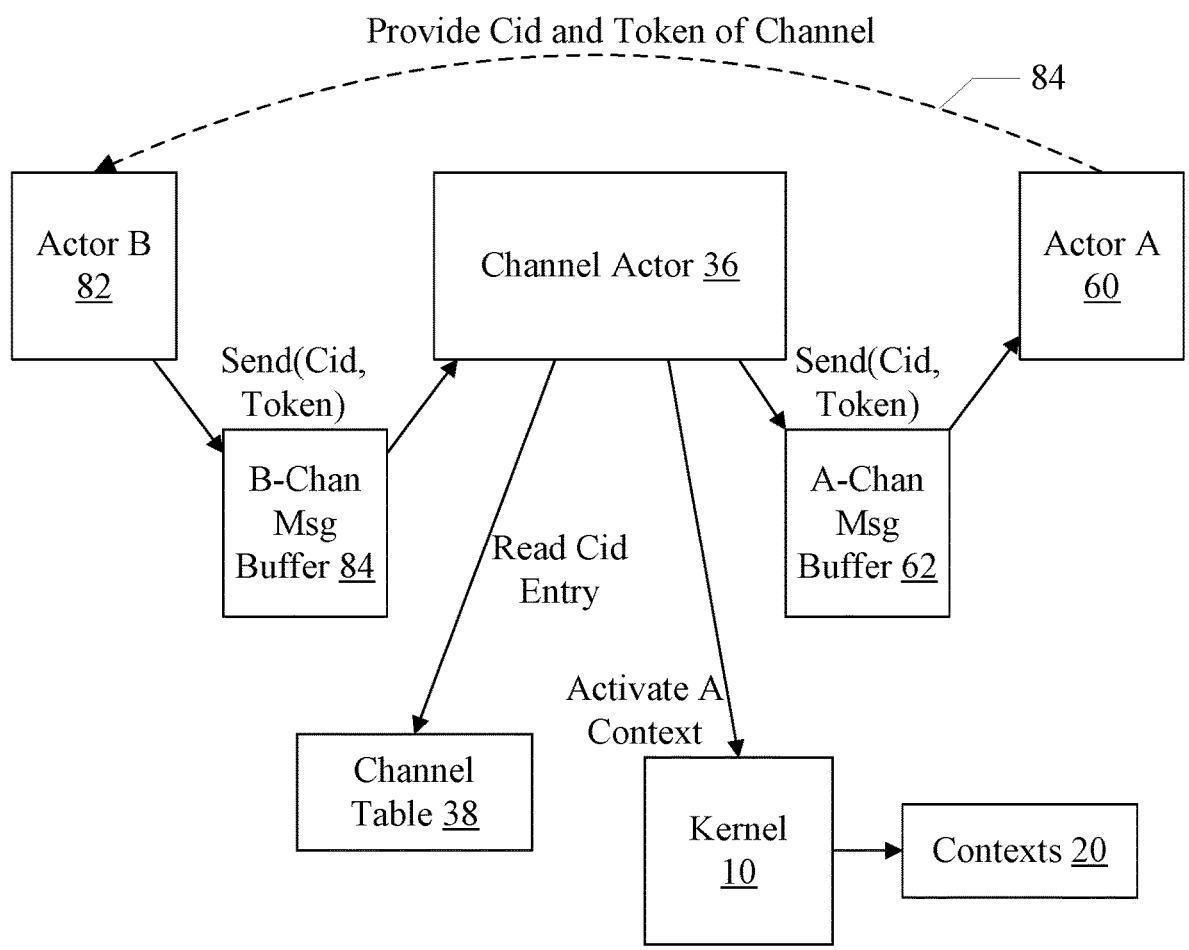
FIG. 8 is a block diagram illustrating one embodiment of transmission of a message between actors.
Figure 9:
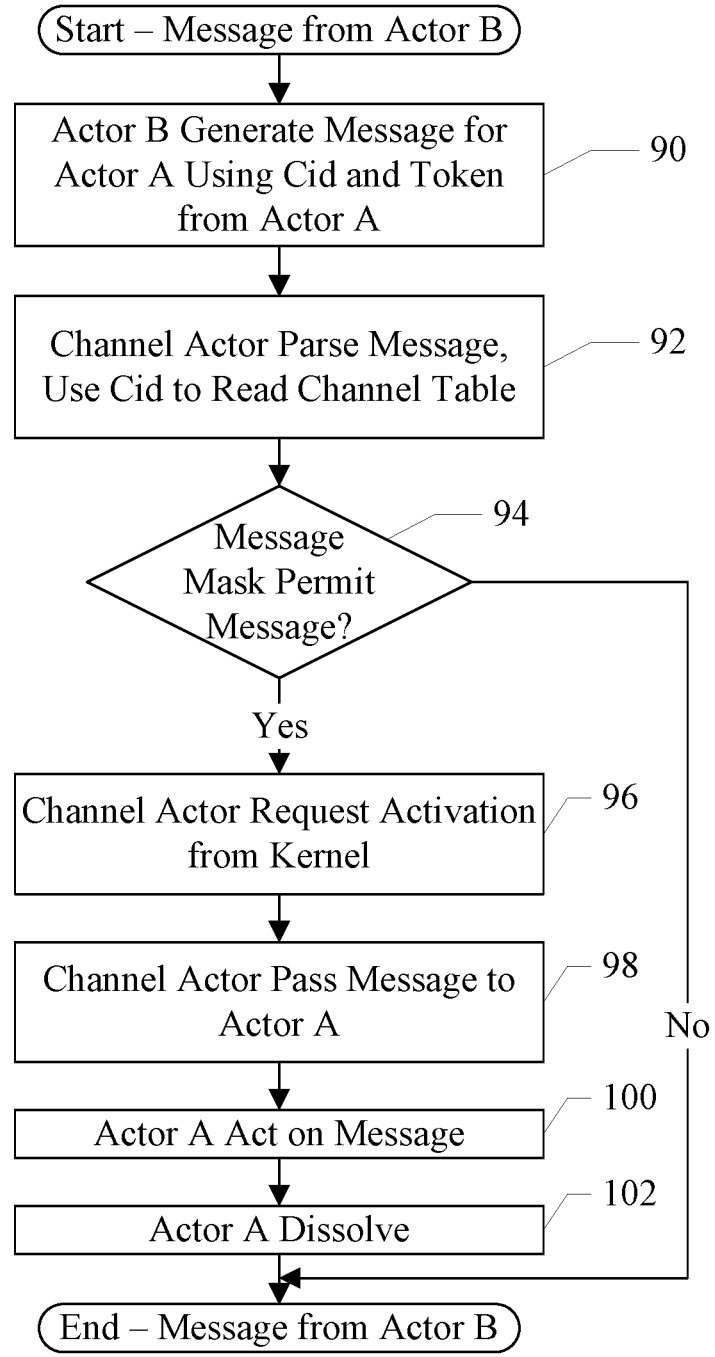
FIG. 9 is a flowchart illustrating one embodiment of transmission of a message between actors.

FIG. 8 is a block diagram illustrating communication between the channel actor 36, actor 60, and an actor 82 (which may be any of the actors 14A-14C, 16A-16B, 30, 32, 34, and/or 36 shown in FIGS. 1 and 2 and may have the structure of FIG. 5) to transmit a message from the actor 82 to the actor 60 over the channel created as illustrated in FIGS. 6 and 7. FIG. 9 is a corresponding flowchart illustrating operation of one embodiment of the actors 60 and 82 and the channel actor 36. While the blocks are shown in a particular order for ease of understanding, other orders may be used. The actors 60 and 82 and/or the channel actor 36 may include code which, when executed, implements the operation shown in FIGS. 8 and 9.

Prior to the actor 82 attempting to send a message over the channel created by the actor 60, the actor 60 transmits the Cid and token for the channel to the actor 82 (e.g. over a channel created by the actor 82) (dotted line 84 in FIG. 8). The actor 82 may generate a message to transmit to the actor 60. The message includes the Cid and token provided by the actor 60 (block 90, FIG. 9). The actor 82 may write the message to a shared memory buffer 84 (similar to the buffer 62) that is shared by the channel actor 36 and the actor 82. The channel actor 36 may be activated (e.g. due to an exception in the actor 82 triggered by a Syscall instruction, as discussed above). The channel actor 36 may parse the message to locate the Cid, and may use the Cid to read the channel table 38 (block 92, FIG. 9).

The channel actor 36 may check the unioned message mask (generated from the capability's message mask and the actor's message mask, as noted above) against the message provided from the actor 82. If the message is not permitted, the channel actor 36 may drop the message, not forwarding it or further processing (decision block 94, "no" leg, FIG. 9). Alternatively, message masking may be performed by the receiving actor 60.

If the message is permitted (decision block 94, "yes" leg, FIG. 9), the channel actor may request activation from the kernel 10 (block 96, FIG. 9). Activation may involve restoring the context to a processor in the system so that actor 60 may execute. The kernel 10 may read the context from the contexts 20, or may create a context if the kernel 10 does not have a context stored for the actor 60 (e.g. the actor previously completed and dissolved). The context may be stored for the actor 60 if, for example, the actor 60 was executing for a different message and was preempted by another actor. The channel actor 36 may also pass the message to actor 60 (e.g. writing the message to the shared buffer 62) (block 98, FIG. 9). The actor 60 may act on the message (block 100). If a response is needed, the actor 60 may generate the response and send it to the actor 82 over the channel represented in FIG. 8 or a different channel, in various embodiments. The actor 60 may also generate a message on a different channel, potentially to yet another actor (not shown in FIGS. 8 and 9) in response to the message. The actor 60 may dissolve upon completion of the processing (block 102). In one embodiment, the dissolve of an actor may include the actor stopping execution and deleting the context by the kernel 10. Thus, an actor is only activated in the system if a communication has been sent to the actor. Alternatively, threads may be returned to a thread pool when dissolved.

Figure 10:
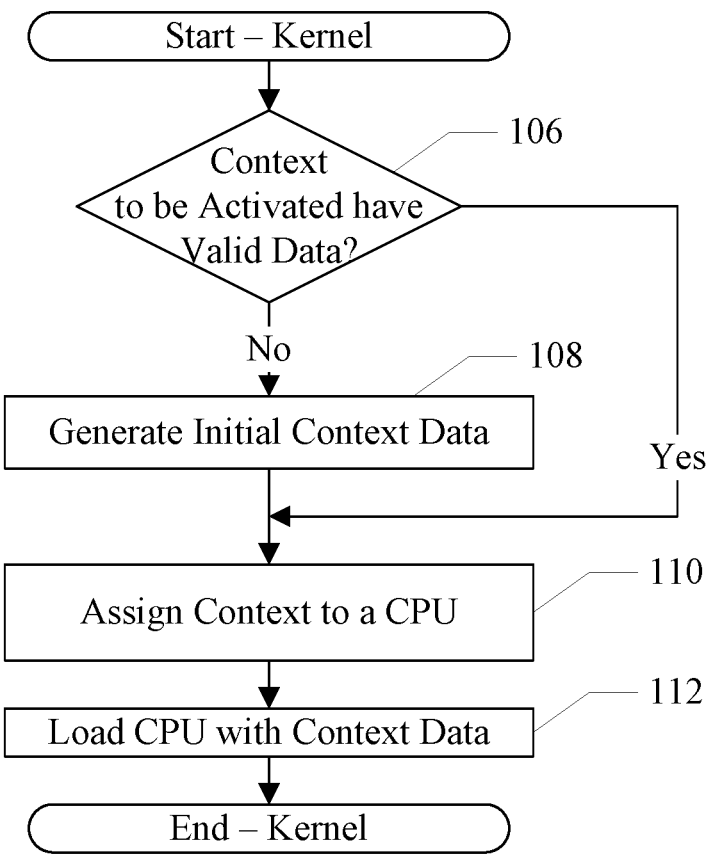
FIG. 10 is a flowchart illustrating operation of one embodiment of a kernel for an activation.

As mentioned previously, the kernel 10 may receive an activation request from the channel actor 36 for an actor at which a message is targeted. FIG. 10 is a flowchart illustrating operation of one embodiment of the kernel 10 in response to the activation request. While the blocks are shown in a particular order for ease of understanding, other orders may be used. The kernel 10 may include code which, when executed, implements the operation shown in FIG. 10.

The kernel 10 may examine the saved contexts 20 and determine if there is valid context data for the context to be activated (decision block 106). If not (decision block 106, "no" leg), the kernel 10 may generate initial context data corresponding to initiating execution of a task (e.g. may provide an initial stack, point the program counter to the function being called in the activated actor, etc.) (block 108). The kernel 10 may assign the saved or created context to a processor (e.g. a CPU in the system) for execution (block 110). The assigned CPU, if it is executing a different actor at the time of the assignment, may save the context of that actor under direction from the kernel 10. The kernel 10 may load the context for the newly assigned actor into the assigned CPU for execution (block 112).

Figure 11:
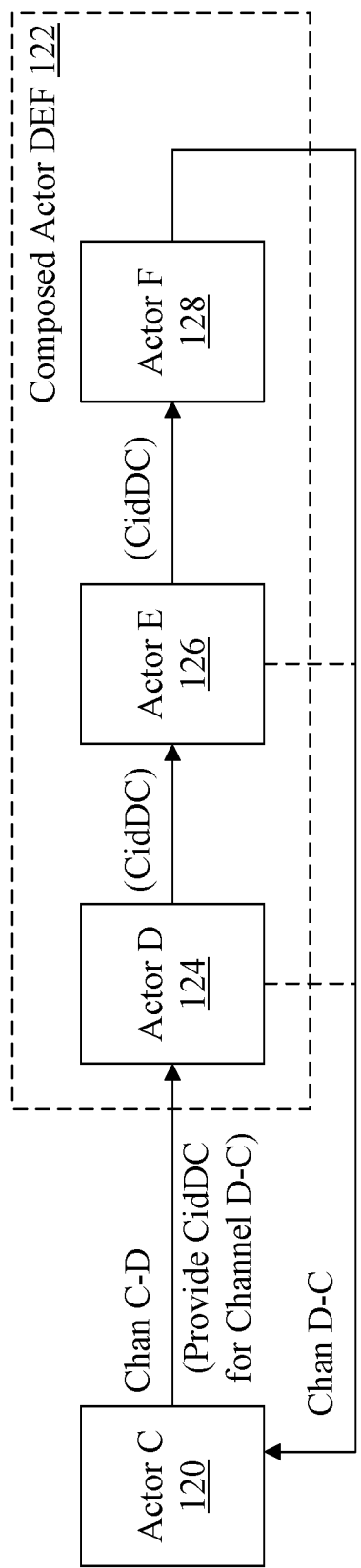
FIG. 11 is a block diagram of one embodiment of a composed actor.

FIG. 11 is a block diagram of one embodiment of an actor 120 and a composed actor 122 that includes actors 124, 126 and 128. The actor 120 transmits messages on a channel C-D to the composed actor 122 and receives messages from the composed actor 122 on the channel D-C. The actor 120 may provide the Cid of the channel D-C(CidDC in FIG. 11) on the channel C-D to the composed actor 122. Within the composed actor 122, the actor 124 is the receiver on the channel C-D, and has a channel to the actor 126. The actor 126 has a channel to the actor 128. The actor 124 may pass the CidDC to the actor 126, which may pass the CidDC to the actor 128. In this manner, the actor 128 may communicate over the channel D-C even if the channel D-C was originally established by the actor 120 with the actor 124. Accordingly, it may appear to the actor 120 that it is communicating with a single actor 122 even though the actor is actually a combination of the three actors 124, 126, and 128 in this embodiment.

FIG. 11 illustrates an embodiment having a serial connection of three actors 124, 126, and 128. That is, the actor 124 may perform one or more functions based on input from the actor 120 and may output a result as an input to the actor 126 in response. In response to the input from the actor 124, the actor 126 may perform one or more functions and may output a result as input to the actor 128. In response to the input from the actor 126, the actor 128 may provide one or more functions and may provide an output to the actor 120. Internal to the composed actor 122, each actor 124, 126, and 128 may receive input and generate output in a similar manner to the instantiation of that actor 124, 126, and 128 directly (i.e. not within a composed actor). That is, the actor 124, 126, or 128 may be the same within the composed actor and operating as a stand-alone actor. The component actors of a composed actor need not be changed to be included in a composed actor.

In an embodiment, one or more of the actors 124, 126, and 128 may not act on every message. For example, the actor 124 may operate on some messages, and may pass others through to the actor 126. The actor 126 may operate on other ones of the messages and pass remaining messages through to the actor 128. If actor 124 or 126 completes the processing of a message, that actor may optionally transmit the result (if any) on the Channel D-C to the actor 120. That is, the result need not pass down to the actor 128 to be transmitted.

While the example of FIG. 11 and some other examples in the drawings and described herein show passing one Cid between various actors, it is possible to pass more than one Cid if more than one channel is used in an operation. Additionally, in some cases, no Cids may be passed if none are needed in the operation.

Figure 12:
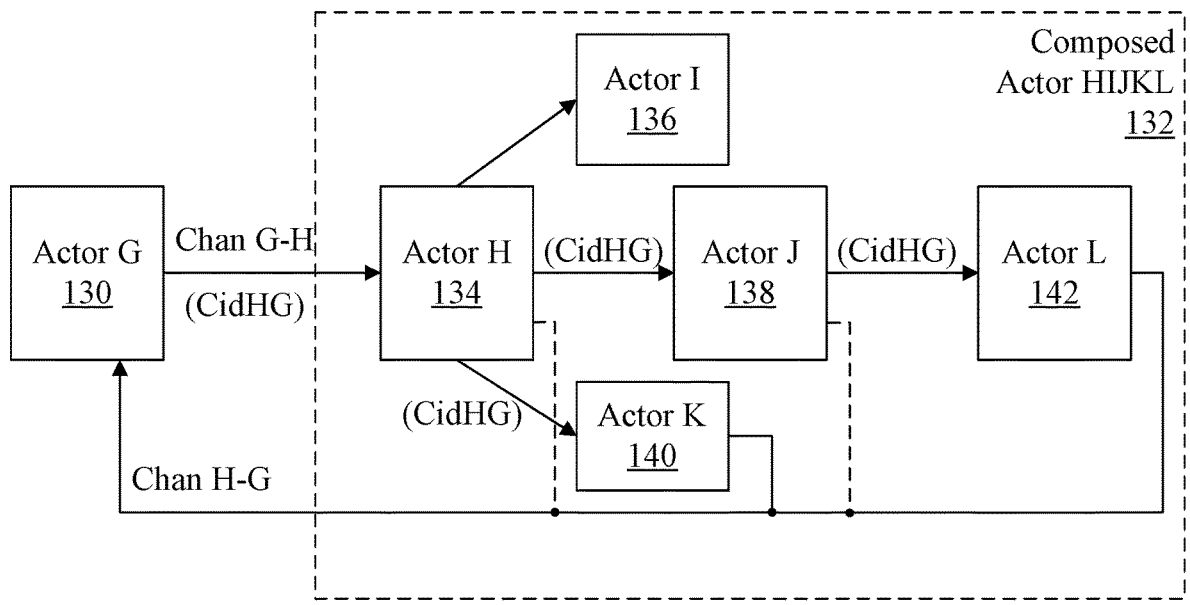
FIG. 12 is a block diagram of another embodiment of a composed actor.

While the embodiment of FIG. 11 is serial in nature, there is no limitation to how component actors may be assembled to form a composed actor. For example, component actors which are independent of each other may execute in parallel (e.g. on different CPUs in a computer system). FIG. 12 is an example of one embodiment of an actor 130 and a composed actor 132 including component actors 134, 136, 138, 140, and 142. The actors 136, 138, and 140 are independent of each other and thus may be executed in parallel. Additionally, both actors 140 and 142 may communicate to the actor 130, and thus the CidHG for the channel to the actor 130 may be passed from the actor 134 to the actor 140 and to the actor 142 through the actor 138. On the other hand, the actor 136 may not communicate with the actor 130, and thus may not require the CidHG. Similar to the discussion above with regard to FIG. 11, the actors 134 and 138 may optionally transmit messages on the channel H-G if processing on the input message is completed by the actors 134 or 138 (shown as dotted connections to the channel H-G in FIG. 12).

Figure 13:
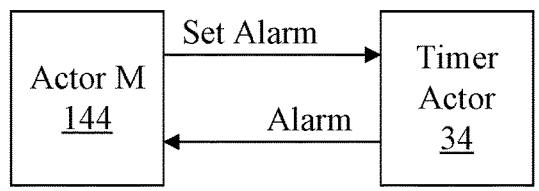
FIG. 13 is a block diagram of one embodiment of an actor and a timer actor.

The composability of actors in the present operating system may permit interposition between actors for various purposes. For example, FIG. 13 is an embodiment of an actor 144 and the timer actor 34. The actor 144 may send a "set alarm" message to the timer actor 34, setting an alarm. The time for the alarm may be relative to the time at which the message is sent (e.g., alarm 10 seconds from now) or may be set for a specific time (e.g., a wall clock time). The timer actor 34 may, at the time that the alarm occurs, transmit an alarm message back to the actor 144.

Figure 14:
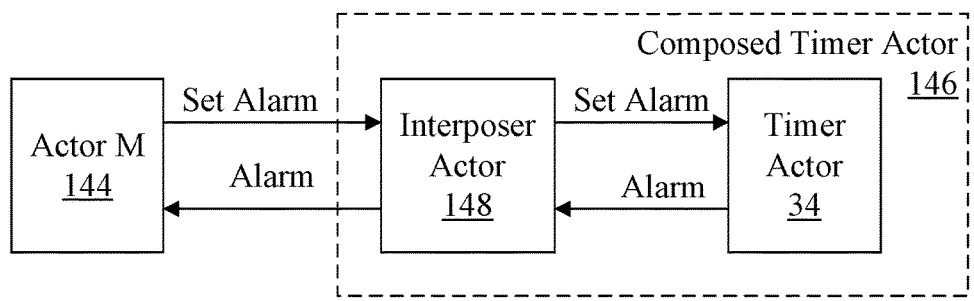
FIG. 14 is a block diagram of one embodiment of an actor and a composed debug timer actor.

In some cases, and may be desirable to interpose an actor between the actor 144 and the timer actor 34. In FIG. 14, the actor 144 is connected to a composed timer actor 146 that includes an interposer actor 148 interposed between the actor 144 and the timer actor 34. The interposer actor 144 may serve a variety of purposes in various embodiments. For example, if debugging of the either the actor 144 or the timer actor 34 is desired, the interposer actor 144 may be a debug actor The debug actor 148 may be connected to the channels to/from the actor 144, and may also be coupled to channels to/from the timer actor 34. The debug actor 148 may thus intercept messages between the actor 144 and the timer actor 34. The debug actor 148 may be able to examine the content of the messages, and even change the content if desired. If the debug actor 148 determines that the messages should continue to propagate to their destination, they may be passed on as shown in FIG. 14. Alternatively, the debug actor 146 may mimic the operation of an actor for a given message. Having the interposed debug actor 148 may also aid in certain debug modes such as single stepping or trapping on certain events.

Other types of interposition may similarly be supported. For example, a interposer actor 148 may serve to sandbox the timer actor 34, isolating the timer actor 34 from other actors. Sandboxing may limit the scope of what the sandboxed actor may do in terms of interacting with the rest of the system. Code that is not trusted, or newly developed, for example, may be sandboxed to prevent undesired effects on the remainder of the system if there is an error or nefarious intent in the code. The interposer actor 148 may also create a protection domain for the timer actor 34, in an embodiment.

Figure 15:
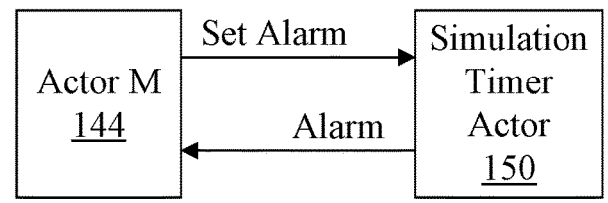
FIG. 15 is a block diagram of one embodiment of a simulator timer actor.

FIG. 15 is an example of an actor interposing in place of the timer actor 34. In this example, the interposing actor is a simulation timer actor 150. If a simulation is being performed, rather than wait for the actual alarm time, it may be desirable to return the alarm message to the actor 144 upon receipt of the set alarm message. The simulation may be updated to indicate that the period of time has elapsed, without actually waiting for that amount of time.

Figure 16:
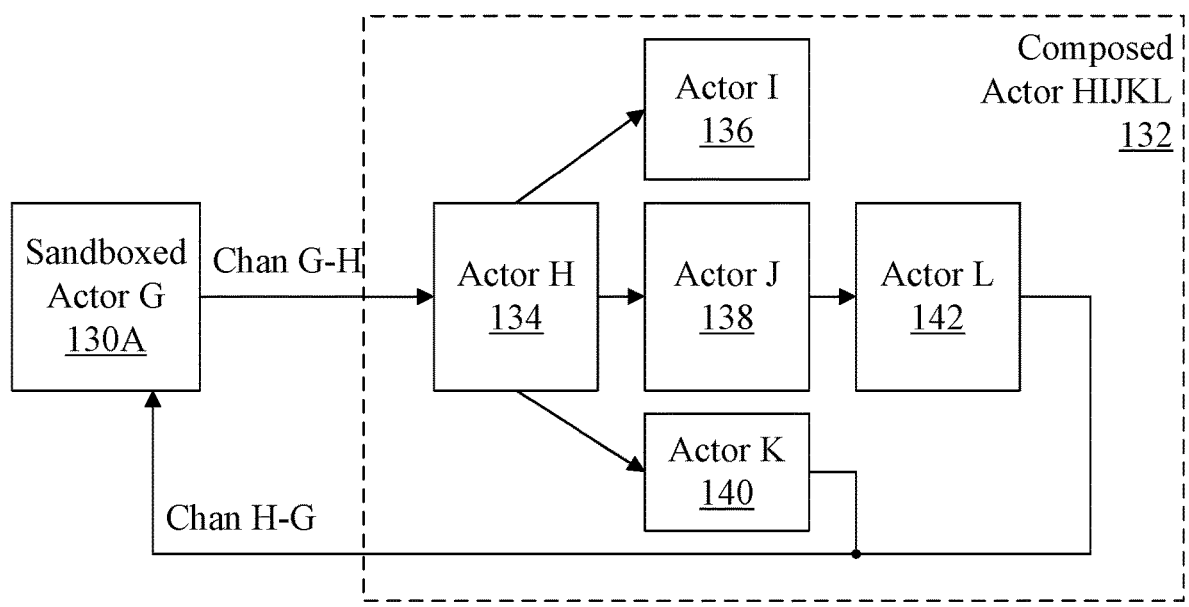
FIG. 16 is a block diagram of one embodiment of a composed actor illustrating virtualization.

FIG. 16 is an example illustrating sandboxing that may be performed through composability. In the example of FIG. 16, the composed actor from FIG. 12 is shown providing sandboxing for a sandboxed actor 130A in place of the actor 130. The other actors 134, 136, 138, 140, and 142 may be the actual actors (non-sandboxed). Thus, the composed actor 132 may provide sandboxing for the sandboxed actor 136A.

It is noted that, while the embodiments of FIGS. 11-16 illustrate unidirectional channels for ease of understanding, the same channel may actually be bidirectional (e.g. one Cid may be used to communicate in both directions between actors).

Figure 17:
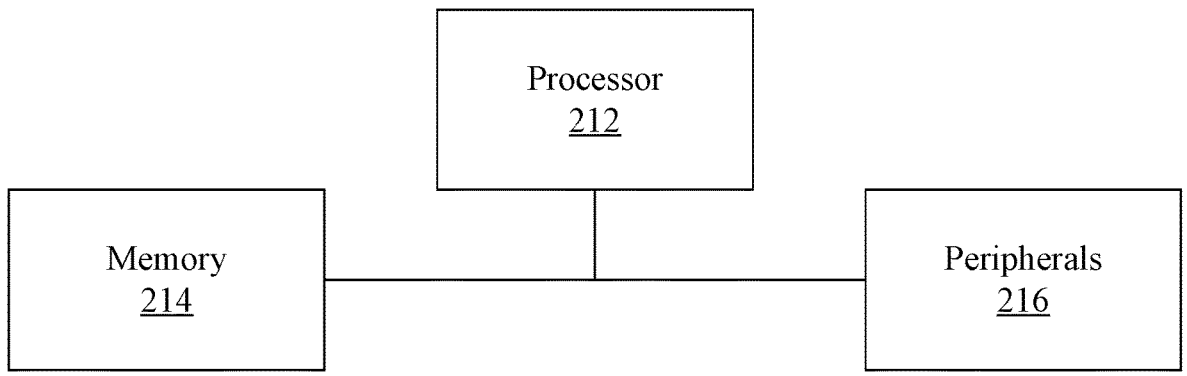
FIG. 17 is a block diagram of one embodiment of a computer system.

Tuning now to FIG. 17, a block diagram of one embodiment of an exemplary computer system 210 is shown. In the embodiment of FIG. 17, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various actors, capabilities functions, and/or the kernel. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 18:
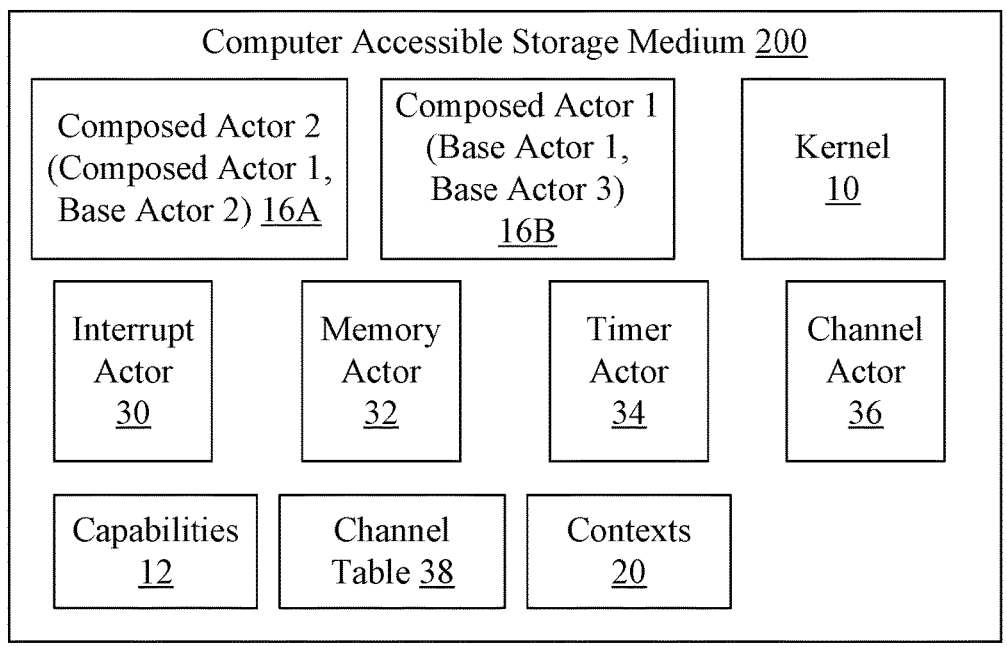
FIG. 18 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 18), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC)).

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 18 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 18 may store code forming the various actors 16A-16B, 14A-14C, 30, 32, 34, and 36, the kernel 10, and/or the functions in the capabilities 12. The computer accessible storage medium 200 may still further store one or more data structures such as the channel table 38 and/or the contexts 20. The various actors 16A-16B, 14A-14C, 30, 32, 34, and 36, the kernel 10, and/or the functions in the capabilities 12 may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions which are computer-executable on a computer, wherein the plurality of instructions comprise:
   a plurality of capabilities, each of the plurality of capabilities comprising at least one function that is computer-executable;
   a plurality of actors, each actor associated with one or more capabilities of the plurality of capabilities, and each actor computer-executable to implement a respective part of an operating system for the computer;
   wherein the plurality of actors intercommunicate using messages transmitted via channels between the plurality of actors, wherein a first actor of the plurality of actors receives messages on a first channel from a second actor of the plurality of actors and the first actor specifies which messages the first actor will permit on the first channel when the first channel is created; and
   a channel actor that creates the channels and that causes an activation of the first actor in response to a first message on the first channel, wherein the channel actor assigns a channel identifier to the first channel, and wherein the first actor provides the channel identifier and a first value assigned to the first channel by the first actor to the second actor to use to send messages to the first actor.

2. The non-transitory computer accessible storage medium as recited in claim 1 wherein the plurality of instructions further comprise a kernel that executes in privileged space, wherein the kernel receives the activation and loads a context of the first actor into a processor in the computer to be executed by the processor.

3. The non-transitory computer accessible storage medium as recited in claim 2 wherein the channel actor, the plurality of actors, and the functions in the plurality of capabilities execute in user space.

4. The non-transitory computer accessible storage medium as recited in claim 2 wherein only the kernel executes in privileged space.

5. The non-transitory computer accessible storage medium as recited in claim 2 wherein the kernel excludes other services besides managing contexts for actors.

6. The non-transitory computer accessible storage medium as recited in claim 2 wherein the kernel is configured to initialize the context if the context is not stored in memory.

7. The non-transitory computer accessible storage medium as recited in claim 6 wherein the first actor terminates execution in response to completing operation based on a received message, and wherein the kernel deletes the context for the first actor responsive to the first actor terminating execution.

8. The non-transitory computer accessible storage medium as recited in claim 1 wherein the channel actor maps the channel identifier to a context identifier for the first actor.

9. The non-transitory computer accessible storage medium as recited in claim 1 wherein the second actor passes the channel identifier and the first value to a third actor of the plurality of actors, and wherein the third actor communicates with the first actor using the first channel.

10. The non-transitory computer accessible storage medium as recited in claim 1 wherein the second actor is assembled from a plurality of the plurality of actors.

11. The non-transitory computer accessible storage medium as recited in claim 10 wherein the plurality of the plurality of actors use the channel identifier to communicate on the first channel with the first actor.

12. The non-transitory computer accessible storage medium as recited in claim 10 wherein two or more of the plurality of the plurality of actors in the second actor are arranged in series, whereby an output of one of the two or more of the plurality of the plurality of actors is an input to another one of the two or more of the plurality of the plurality of actors.

13. The non-transitory computer accessible storage medium as recited in claim 10 wherein two or more of the plurality of the plurality of actors execute independently.

14. The non-transitory computer accessible storage medium as recited in claim 10 wherein the plurality of instructions further comprise a third actor that is assembled from the second actor and one or more of the plurality of actors.

15. The non-transitory computer accessible storage medium as recited in claim 10 wherein the second actor is recompiled into a single module prior to deployment of the second actor on a computer.

16. The non-transitory computer accessible storage medium as recited in claim 1 wherein an attempt to send a message from the first actor to the second actor results in an exception in the first actor, and wherein the channel actor is invoked in response to the exception.

17. A non-transitory computer accessible storage medium storing a plurality of instructions which are computer-executable on a computer, wherein the plurality of instructions comprise:
   a plurality of capabilities, each of the plurality of capabilities comprising at least one function that is computer-executable;
   a plurality of actors, each actor associated with one or more capabilities of the plurality of capabilities, and each actor computer-executable to implement a respective part of an operating system for the computer;
   wherein the plurality of actors intercommunicate using messages transmitted via channels between the plurality of actors, wherein a first actor of the plurality of actors receives messages on a first channel from a second actor of the plurality of actors; and
   wherein the second actor is assembled from a plurality of the plurality of actors, and wherein a third actor of the plurality of the plurality of actors receives a channel identifier for the first channel from the first actor and passes the channel identifier to a fourth actor of the plurality of the plurality of actors to communicate with the first actor, wherein the fourth actor transmitting a message on the first channel causes an activation of the first actor.

18. The non-transitory computer accessible storage medium as recited in claim 17 wherein the fourth actor communicates with the first actor using the channel identifier.

19. A non-transitory computer accessible storage medium storing a plurality of instructions which are computer-executable on a computer, wherein the plurality of instructions comprise:
- a plurality of capabilities, each of the plurality of capabilities comprising at least one function that is computer-executable;
- a plurality of actors, each actor associated with one or more capabilities of the plurality of capabilities, and each actor computer-executable to implement a respective part of an operating system for the computer, wherein a privilege level of each actor is a minimal amount of privilege that permits the actor to implement the respective part of the operating system; and
- wherein the plurality of actors intercommunicate using messages transmitted via channels between the plurality of actors, wherein a first actor of the plurality of actors receives messages on a first channel from a second actor of the plurality of actors and the first actor specifies which messages the first actor will permit on the first channel when the first channel is created, wherein the isolation of each actor from the plurality of actors via the channels and the minimal amount of privilege accorded each actor improves security in the system.

20. The non-transitory computer accessible storage medium as recited in claim 19 wherein one of the plurality of actors is a channel actor that creates the first channel and that causes an activation of the first actor in response to the messages on the first channel, wherein the channel actor assigns a channel identifier to the first channel, and wherein the first actor provides the channel identifier and a first value assigned to the first channel by the first actor to the second actor to use to send messages to the first actor.

* * * * *